United States Patent [19]

Sutor

[11] Patent Number: 4,495,301

[45] Date of Patent: Jan. 22, 1985

[54] INSULATING REFRACTORIES

[75] Inventor: Peter T. Sutor, Pittsburgh, Pa.

[73] Assignee: Dresser Industries, Inc., Dallas, Tex.

[21] Appl. No.: 482,648

[22] Filed: Apr. 6, 1983

[51] Int. Cl.³ ............................................. C04B 35/02
[52] U.S. Cl. ..................................... 501/124; 501/127
[58] Field of Search ................................ 501/124, 127

[56] References Cited

U.S. PATENT DOCUMENTS

| | | | |
|---|---|---|---|
| 2,965,506 | 12/1960 | Ueltz | 501/124 |
| 3,223,539 | 12/1965 | Hyde et al. | 501/124 |
| 3,395,032 | 7/1968 | Criss | 501/124 |
| 4,174,226 | 11/1979 | Fitzpatrick et al. | 501/124 |
| 4,244,745 | 1/1981 | Havranek et al. | 501/124 |

Primary Examiner—Mark Bell
Attorney, Agent, or Firm—Barry E. Deutsch

[57] ABSTRACT

Lightweight refractory monolith forming batch comprising selected high alumina materials.

3 Claims, No Drawings

INSULATING REFRACTORIES

BACKGROUND OF THE INVENTION

This invention relates to insulating refractories and more particularly, to lightweight, porous, refractory insulating castables suitable for use in lining secondary ammonia reformers.

Most ammonia and ammonia derivatives are currently manufactured by the steam reformed process. In this process natural gas or refinery gas is cracked or broken down over a catalyst, such as nickel, by combining with steam to yield hydrogen, carbon monoxide and carbon dioxide. These gases are then passed into a secondary reformer where air is introduced and combustion occurs removing free oxygen by conversion to water with some hydrogen.

If silica is present in the refractory, it will be leached out and deposited downstream in the unit. The present compositions are characterized by having low density and are composed of low silica aluminas that previously had not been used in this manner. Use of these special aluminas in the castable results in lower density and better insulating values.

It has been well known and understood in the art that various combustibles can be mixed with unfired refractory material so that, after forming and firing, a porous skeletal structure for use as a refractory insulation, will result. The combustibles have included various organic materials both naturally occurring and synthethic. Diatomaeous earth, gas developing materials and foaming agents, fly ash, asbestos, exfoliated pyrophyllite, mica and the like have also been suggested and utilized in forming a low density, lightweight refractory insulation material.

The present refractories may be defined as those of the high alumina type and are classified according to their $Al_2O_3$ contents into groups having, approximately, greater than 50% $Al_2O_3$, by oxide analysis. Those containing 50 to 90% of $Al_2O_3$ are made by blending the various high alumina refractory materials, while those of 99% content are made of high purity alumina. The more common high alumina refractory materials and their typical $Al_2O_3$ contents are discussed and set forth in U.S. Pat. No. 3,067,050 issued Dec. 4, 1962 for "Alumina Refractories".

The present invention is predicated upon a discovery that high alumina refractory monolithic bodies having densities typical of insulating refractories, and yet having high temperature strength and wear resistance similar to much denser bodies, may be prepared from batches according to this invention.

Accordingly, it is among the objects of this invention to provide high alumina monolithic refractories having many of the desirable properties of those previously available, including low permeability, but which have lower density and heat capacity.

In accordance with the present invention, there is provided a lightweight refractory monolith forming, high alumina size graded batch. The batch comprises about 15 to 40%, by weight, of hydrated alumina and/or activated alumina. The remainder is high alumina refractory material analyzing at least about 50% $Al_2O_3$ and calcium aluminate cement. The high alumina refractory material includes at least 25%, by weight of the batch, of hollow spherical particles of alumina. The cement constitutes at least about 15%, by weight, of the batch.

In a preferred embodiment, the spherical alumina particles constitute from about 25 to 55%, by weight of the batch, and the cement constitutes from about 25 to 30%, by weight, thereof.

The term "high alumina refractory monolithic lining" has a well-known (although unwritten) meaning in the refractories art. The ASTM classification of refractory castables is not based on chemical analysis (see ASTM designation C401-60). HIgh alumina refractory monolith refers to linings comprising from 70 to 90%, by weight, refractory aggregate containing more than about 70% alumina, such that the silica present is tied up as mullite and from 10 to 30% calcium alumina cement. Table I includes the chemical analysis of some suitable high alumina starting materials. Table I also includes the chemical analysis of a suitable calcium aluminate cement used in the practice of this invention.

TABLE I

|  | Spherical Alumina | Tabular Alumina | Calcium Aluminate Cement |
|---|---|---|---|
| $SiO_2$ | 0.67% | 0.10% | 0.40% |
| $Al_2O_3$ | 99.0 | 99.60 | 75.0 |
| $TiO_2$ | 0.01 | 0.01 | 0.04 |
| $Fe_2O_3$ | 0.01 | 0.20 | 0.10 |
| CaO | 0.10 | 0.04 | 24.10 |
| MgO | 0.05 | 0.04 | 0.10 |
| Total Alk | 0.10 | 0.05 | 0.30 |
| LOI | — | — | 0.40 |

The spherical particles of alumina may be produced by heating a high purity alumina material above its melting point. While it is still molten, the alumina charge is poured through a blast of high velocity air, to produce small, bubble-like hollow spheres. The tabular alumina is a commercially available material well known in the art as is the calcium alumina cement. The hydrated alumina used in the invention is preferably that produced by ALCOA and sold under the designation C-331 or C-30. The activated or desiccant alumina preferably is also that produced by ALCOA and identified as F-1 alumina. These aluminas analyzed greater than 99% $Al_2O_3$.

Preferred sizing for the mixes of the invention is about 10 to 25% $-3+10$ mesh and 45 to 55% $-65$ mesh.

Mixes according to the invention are preferably blended with water to provide a uniform, smooth, substantially non-flowing cream-like material. The mixes and their properties are shown in Table II below.

TABLE II

| Mix Designation: | A | B | C | D | E | F | G | H | I | J | K | L |
|---|---|---|---|---|---|---|---|---|---|---|---|---|
| Mix: | | | | | | | | | | | | |
| Spherical Alumina | 35% | 35% | 35% | 35% | 35% | 35% | 35% | 25% | 45% | 35% | 55% | 55% |
| Tabular Alumina | 40 | 30 | 20 | 10 | — | 20 | — | 10 | — | 10 | — | — |
| Cement | 25 | 25 | 25 | 25 | 25 | 25 | 25 | 25 | 25 | 15 | 30 | 30 |
| Activated Alumina | — | 10 | 20 | 30 | 40 | — | 20 | 40 | 30 | 40 | — | 15 |
| Hydrated Alumina | — | — | — | — | — | 20 | 20 | — | — | — | 15 | — |
| Plus Addition: | | | | | | | | | | | | |

TABLE II-continued

| Mix Designation: | A | B | C | D | E | F | G | H | I | J | K | L |
|---|---|---|---|---|---|---|---|---|---|---|---|---|
| Water | 17.0 | 20.0 | 23.5 | 27.5 | 31.0 | 17.5 | 24.0 | 29.0 | 29.0 | 32.0 | 25.7 | 28.0 |
| Bulk Density, pcf (Av 5) After Drying at 250° F. | 97 | 96 | 91 | 84 | 80 | 93 | 84 | 88 | 78 | 77 | 79 | 76 |
| After Heating | 90 | 89 | 83 | 76 | 72 | 81 | 71 | 78 | 70 | 70 | 67 | 67 |
| Modulus of Rupture, psi (Av 3), After Drying at 250° F. | 500 | 430 | 380 | 280 | 240 | 490 | 340 | 290 | 200 | 60 | 410 | 380 |
| Dimensional Change After Heating at 1500° F. | | | | | | | | | | | | |
| Linear Change, % | ±0.1 | 0.0 | ±0.1 | +0.1 | −0.1 | +0.1 | −0.1 | 0.0 | 0.0 | −0.2 | +0.3 | ±0.5 |
| Volume Change, % | ±0.4 | +0.3 | +0.3 | +0.1 | ±0.2 | ±0.5 | ±0.3 | −0.2 | +0.5 | ±1.0 | ±1.0 | ±0.6 |

Mix A was a standard lightweight castable. In Mixes B through E, the percentage of activated or desiccant alumina substituted for tabular alumina was increased from 10 to 40%. Mix E had a water-free density of 72% pcf compared to 90 pcf for Mix A. Mixes F and G were similar to C and E, respectively, except that hydrated alumina replaced the activated alumina at a 20% level. The substitution of hydrated alumina for activated alumina had little effect on density, but dried strengths were higher with the hydrated alumina. Mixes H and I contained 25 and 45% bubble alumina, respectively. The physical properties of these mixes were not quite as good as several other mixes that contained 35% spherical alumina. Mix J illustrates a mix containing a relatively small amount of calcium aluminate cement and Mixes K and L illustrate mixes containing larger amounts of spherical alumina.

Considering density, cost and other properties, the optimum composition would be Mix G. However, other mixes are suitable and would be within the confines of the invention.

In the foregoing discussion, all parts and percentages are by weight, and all chemical analyses are given on the basis of an oxide analysis in conformity with the common practice of reporting the chemical analyses of refractory materials. All screen sizes are according to the Tyler series.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A lightweight refractory monolith forming high alumina sized graded batch comprising about 15 to 40%, by weight, of at least one material selected from the group consisting of hydrated alumina and activated alumina, the remainder being high alumina refractory material having an alumina content of at least about 50% and calcium aluminate cement, said high alumina refractory material including at least 25%, by weight of the batch, of hollow spherical particles of alumina, the cement constituting at least about 15%, by weight of the batch.

2. The batch of claim 1, in which the spherical alumina particles constitute from about 25 to 55%, by weight thereof.

3. The batch of claim 1, in which the cement constitutes from about 25 to 30% thereof.

* * * * *